US009680907B2

(12) United States Patent
Redfern et al.

(10) Patent No.: US 9,680,907 B2
(45) Date of Patent: Jun. 13, 2017

(54) INTELLIGENT, MOBILE, LOCATION-AWARE NEWS READER APPLICATION FOR COMMUTERS

(71) Applicant: LinkedIn Corporation, Mountain View, CA (US)

(72) Inventors: Joff Redfern, Truckee, CA (US); Manish Mohan Sharma, San Jose, CA (US)

(73) Assignee: LindkedIn Corporation, Sunnyvale, CA (US)

( * ) Notice: Subject to any disclaimer, the term of this patent is extended or adjusted under 35 U.S.C. 154(b) by 324 days.

(21) Appl. No.: 13/833,474

(22) Filed: Mar. 15, 2013

(65) Prior Publication Data

US 2014/0244750 A1 Aug. 28, 2014

Related U.S. Application Data

(60) Provisional application No. 61/771,010, filed on Feb. 28, 2013.

(51) Int. Cl.
| G06F 15/16 | (2006.01) |
| H04L 29/08 | (2006.01) |
| H04W 4/00 | (2009.01) |
| H04W 4/20 | (2009.01) |
| G06F 17/30 | (2006.01) |
| G06Q 30/02 | (2012.01) |

(52) U.S. Cl.
CPC .......... *H04L 67/02* (2013.01); *G06F 17/3087* (2013.01); *G06F 17/30867* (2013.01); *G06Q 30/02* (2013.01); *H04L 67/306* (2013.01); *H04W 4/001* (2013.01); *H04W 4/206* (2013.01)

(58) Field of Classification Search
None
See application file for complete search history.

(56) References Cited

U.S. PATENT DOCUMENTS

| 7,974,771 | B2 * | 7/2011 | Cobbold | 701/117 |
| 2010/0291950 | A1 * | 11/2010 | Lin et al. | 455/456.3 |
| 2012/0084248 | A1 * | 4/2012 | Gavrilescu | 706/52 |
| 2012/0190386 | A1 * | 7/2012 | Anderson | 455/456.3 |
| 2013/0226937 | A1 * | 8/2013 | Moritz | G06F 17/3087 707/748 |

* cited by examiner

*Primary Examiner* — Mohamed Ibrahim
(74) *Attorney, Agent, or Firm* — Schwegman Lundberg & Woessner, P.A.

(57) ABSTRACT

A method of generating alerts pertaining to a commute by the user and selecting content items to be presented to the user in conjunction with the alerts is disclosed. A pattern in a commuting by a user is detected. A content item is selected based on a correspondence between the content item and other users and a similarity between the user and the other users. An alert is generated pertaining to a milestone in the pattern of the commuting by the user. The content item and the alert are transmitted for presentation in combination to the user during the commuting by the user.

9 Claims, 7 Drawing Sheets

INTELLIGENT, MOBILE, LOCATION-AWARE NEWS READER APPLICATION FOR COMMUTERS

CROSS-REFERENCE TO RELATED APPLICATIONS

This application claims the benefit of U.S. Provisional Application No. 61/771,010, filed Feb. 28, 2013, entitled "INTELLIGENT, MOBILE, LOCATION-AWARE NEWS READER APPLICATION FOR COMMUTERS," which is incorporated herein by reference in its entirety.

TECHNICAL FIELD

This application relates generally to the technical field of content presentation, and, in one specific example, to selecting content items for presentation to a user during a commute of the user.

BACKGROUND

During commuting (e.g., between home and an office), a user may browse Internet content items pertaining to miscellaneous subjects (e.g., news, sports scores, stock performance, and so on). Additionally, the user may browse Internet content items pertaining to the commute (e.g., bus schedules, train schedules, traffic delays, and so on). The user may perform such browsing on a mobile phone, tablet PC, laptop, or other device. A news reader executing on the device may be configured to provide the user with personalized content. However, such personalized content is not selected or presented based on the context of the user's commute.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive concepts in unnecessary detail, well-known instruction instances, protocols, structures, and techniques have not been shown in detail. As used herein, the term "or" may be construed in an inclusive or exclusive sense, the term "user" may be construed to include a person or a machine, and the term "interface" may be construed to include an application program interface (API) or a user interface.

In various embodiments, a method of generating alerts pertaining to a commute by the user and selecting content items to be presented to the user in conjunction with the alerts is disclosed. A pattern in a commuting by a user is detected. A content item is selected based on a correspondence between the content item and other users and a similarity between the user and the other users. An alert is generated pertaining to a milestone in the pattern of the commuting by the user. The content item and the alert are transmitted for presentation in combination to the user during the commuting by the user.

This method and other methods or embodiments disclosed herein may be implemented as a computer system having one or more modules (e.g., hardware modules or software modules). Such modules may be executed by one or more processors of the computer system. This method and other methods or embodiments disclosed herein may be embodied as instructions stored on a machine-readable medium that, when executed by one or more processors, cause the one or more processors to perform the instructions.

Figure 1:
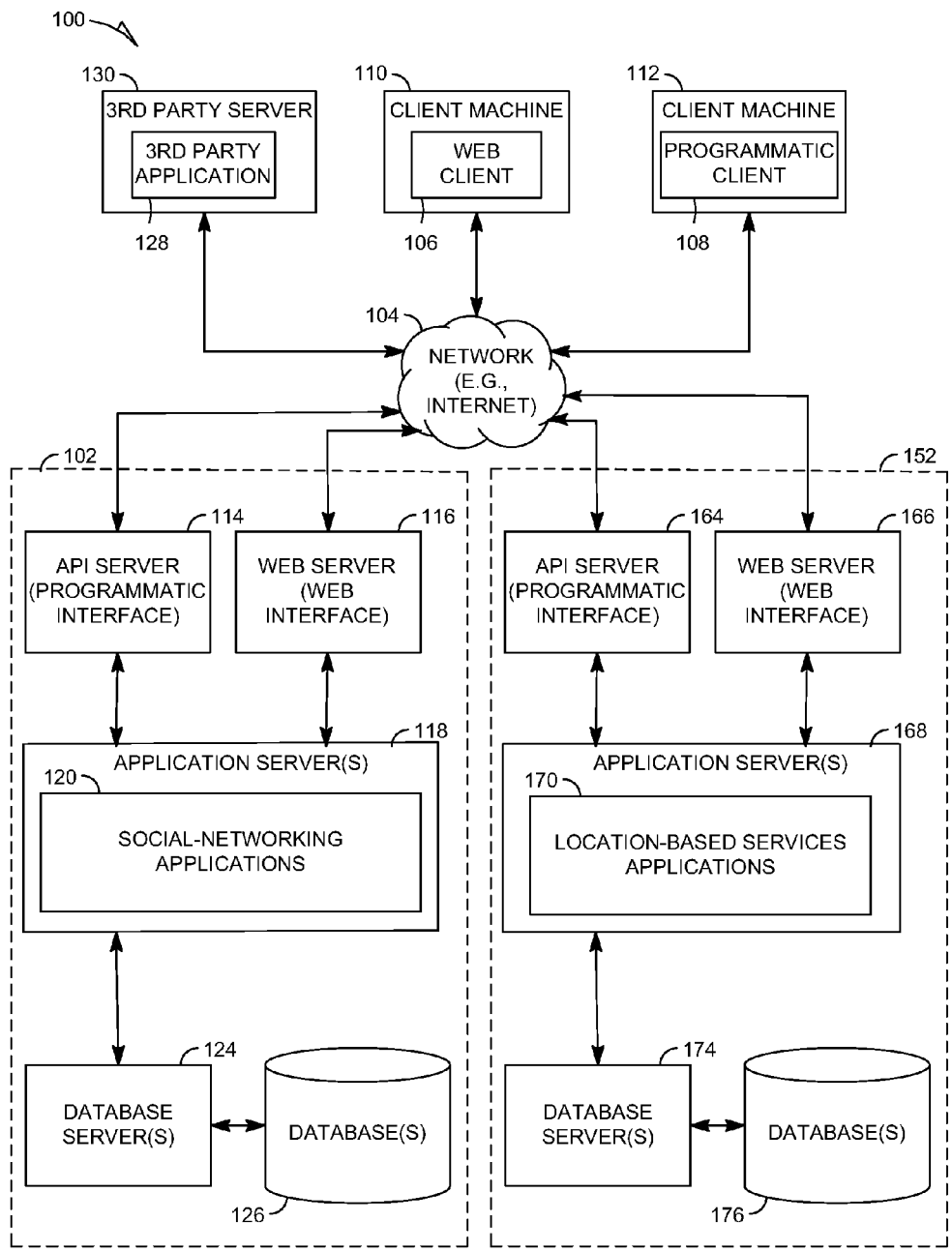
FIG. 1 is a network diagram depicting a client-server system, within which various example embodiments may be deployed.

FIG. 1 is a network diagram depicting a client-server system 100, within which various example embodiments may be deployed. A networked system 102, in the example forms of a social-networking system or other communication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112. Each of the one or more clients 106, 108 may include a software application module (e.g., a plug-in, add-in, or macro) that adds a specific service or feature to a larger system.

Within the networked system 102, an API server 114 and a web server 116 are coupled to, and provide programmatic and web interfaces respectively to, one or more application servers 118. The application servers 118 host one or more social-networking application(s) 120. The application servers 118 are, in turn, shown to be coupled to one or more databases servers 124 that facilitate access to one or more databases or NoSQL or non-relational data stores 126.

An additional networked system 152, in the example forms of a location-based services system or other communication system, provides server-side functionality, via a network 104 to the one or more clients.

Within the networked system 152, an API server 164 and a web server 166 are coupled to, and provide programmatic and web interfaces respectively to, one or more application servers 168. The application servers 168 host one or more applications (e.g., location-based services application(s) 170). The application servers 168 are, in turn, shown to be coupled to one or more databases servers 174 that facilitate access to one or more databases or NoSQL or non-relational data stores 176. In various embodiments, the location-based services application(s) 170 are configured to receive information on the geographical position of a mobile device. Thus, for example, the location-based services applications may receive and transmit data pertaining to the location of a user carrying a mobile device during a commute of the user from a first location to a second location. A mobile device may be any device that is capable of being carried around. Examples of mobile devices may include a laptop computer, a tablet computer (e.g., an iPad), a mobile or smart phone (e.g., an iPhone), a smartwatch (e.g., a Pebble E-Paper Watch), an augmented reality head-mounted display (e.g., Google Glass), and so on.

The applications 120 and 170 may provide a number of functions and services to users who access the networked systems 102 and 152. While the applications are shown in FIG. 1 to form part of the networked systems 102 and 152, in alternative embodiments, the applications may form part of a service that is separate and distinct from the networked systems 102 and 152.

Further, while the system 100 shown in FIG. 1 employs a client-server architecture, various embodiments are, of course, not limited to such an architecture, and could equally well find application in a distributed, or peer-to-peer, architecture system, for example. The various applications could also be implemented as standalone software programs, which do not necessarily have computer networking capabilities. Additionally, although FIG. 1 depicts machines 130, 110, and 112 as being coupled to a networked system 102 and networked system 152, it will be readily apparent to one skilled in the art that machines 130, 110, and 112, as well as client 128, 106, and 108, may be coupled to multiple additional networked systems. For example, the clients 128, 106, and 108 may be coupled to multiple applications, such as applications 120 and 170.

The web client 106 accesses the various applications 120 and 170 via the web interface supported by the web server 116 or the web server 166 respectively. Similarly, the programmatic client 108 accesses the various services and functions provided by the applications 120 and 170 via the programmatic interface provided by the API server 114 and API server 164, respectively. The programmatic client 108 may, for example, perform batch-mode communications between the programmatic client 108 and the networked systems 102 and 152.

FIG. 1 also illustrates a third party application 128, executing on a third party server machine 130, as having programmatic access to the networked systems 102 and 152 via the programmatic interface provided by the API server 114 and the API server 164, respectively. For example, the third party application 128 may, utilizing information retrieved from the networked systems 102 and 152, support one or more features or functions on a website hosted by the third party. The third party website may, for example, provide one or more social-networking functions that are supported by the relevant applications of the networked system 102.

Figure 2:
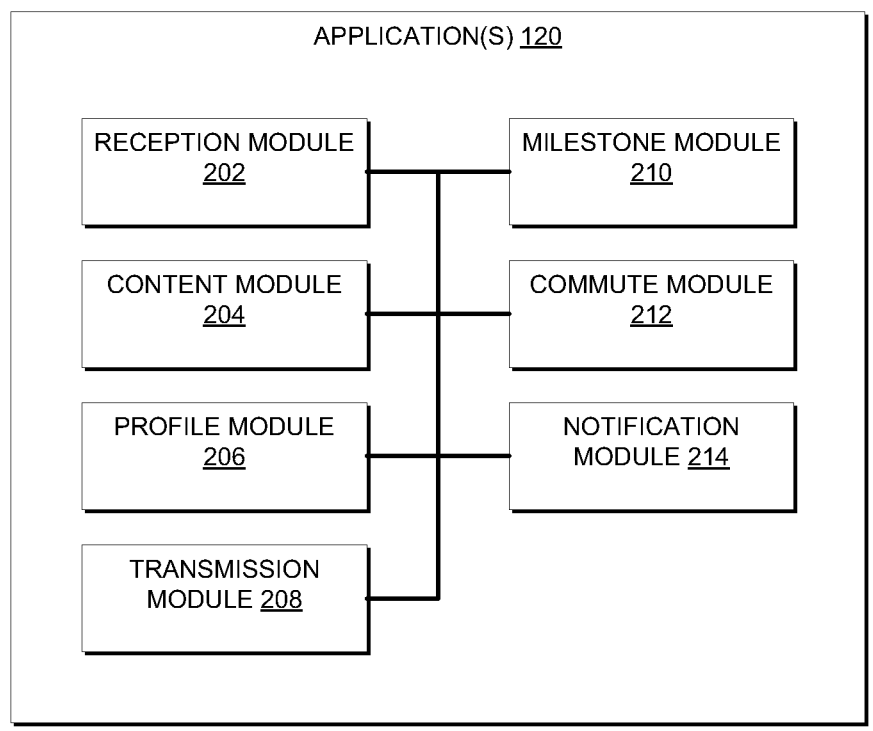
FIG. 2 is a block diagram illustrating example modules that may implement various example embodiments.

FIG. 2 is a block diagram illustrating example modules of the application(s) 120 of FIG. 1. A reception module 202 may be configured to receive communications, such as requests or responses. For example, the reception module 202 may be configured to receive requests for content that is relevant or suited to a commute or a portion of a commute by a user from a first location to a second location. For example, such requests may be received from clients 110, 120, or 130 or location-based services applications 170.

A content module 204 may be configured to select content to be transmitted to the user for presentation to the user (e.g., on a mobile device of the user) during the commute by the user. The content module 204 may, for example, select content based on various factors, such as information about a pattern of a commute by the user, such as an amount of time that the user has to consume the content (e.g., based on a predicted length of the user's commute or a portion of the user's commute), a geographical location of the user, a context of a commute of the user (e.g., whether the user is on his way to work or home), types of content that other users have consumed during similar commutes (e.g., commutes in a similar direction, time of day, etc.); information about the user, such as information collected by the system 102 with respect to the user (e.g., behavior of the user with respect to the system as monitored by the system 102) or information specified by the user (e.g., in a profile of the user) and maintained with respect to the system 102; or similarities between the user and other users (e.g., similarities in professions, interests, and so on), or any other factor known by the system with respect to the user or a pattern of commuting by the user.

A profile module 206 may be configured to maintain a profile of the user with respect to the system 102. For example, the profile module 206 may be configured to receive information about a user from the user. For example, the user may specify information about himself, such as his age, sex, profession, work experience, interests, affiliations, connections to other users, and so on, such as the information that a user may provide to a social-networking system, such as LinkedIn. Or the profile module 206 may be configured to collect information about the user not explicitly provided by the user, such as information about activities of the user with respect to the system 102. Such activities may include information about content that the user has requested with respect to the system 102, such as profiles of other users that the user has viewed, articles posted on the system 102, and so on. In other words, the profile module 206 may maintain information about any activity of the user with respect to the system 102, including content accessed by the user and the times, dates, and durations of such accesses.

A transmission module 208 may be configured to transmit data, such as responses to requests received by the reception module 202. For example, such data may be transmitted to clients 110, 112, or 130 or location-based services application(s) 170.

A milestone module 210 may be configured to maintain or generate information with respect to milestones during a commuting by the user. For example, the milestone module 210 may be configured to identify milestones from data pertaining to commuting by the user, such as data received or generated by a commute module 212.

The commute module 212 may be configured to maintain or generate data pertaining to commuting by the user. For example, the commute module 212 may receive data pertaining to the geographical locations of the user from the location-based services applications 170. The commute module 212, may then ascertain patterns of commuting by the user, such as a path taken by the user from home to work or from work to home during weekdays, or any other pattern of movement by the user that is repeated. Or the milestone module 210 may be configured to receive information pertaining to patterns of commuting by the user from the location-based services application(s) 170.

A notification module 214 may be configured to generate notifications to the user of information relevant to a commuting by the user (e.g., approaching milestones) and content identified (e.g., by the content module 204) as being particularly suited for consumption by the user during the commuting by the user. The notification module 214 may generate such notifications to include commuting information and customized content for presentation in combination to the user, as described in more detail below.

Although the modules 202-220 are depicted in FIG. 2 as being included in the application(s) 120, in various embodiments one or more of the modules may be included in a client, such as the 3rd party application 128, web client 106, or programmatic client 108 of FIG. 1. In other words, the modules may be distributed among the servers and clients such that some or all of the functionality is provided on the server side or some or all of the functionality is provided on the client side. For example, the transmission module may be distributed such that a portion of the transmission module is implemented on the client side (e.g., for sending requests to the server) and a portion of the transmission module is implemented on the server side (e.g., for sending responses to the client).

Figure 3:
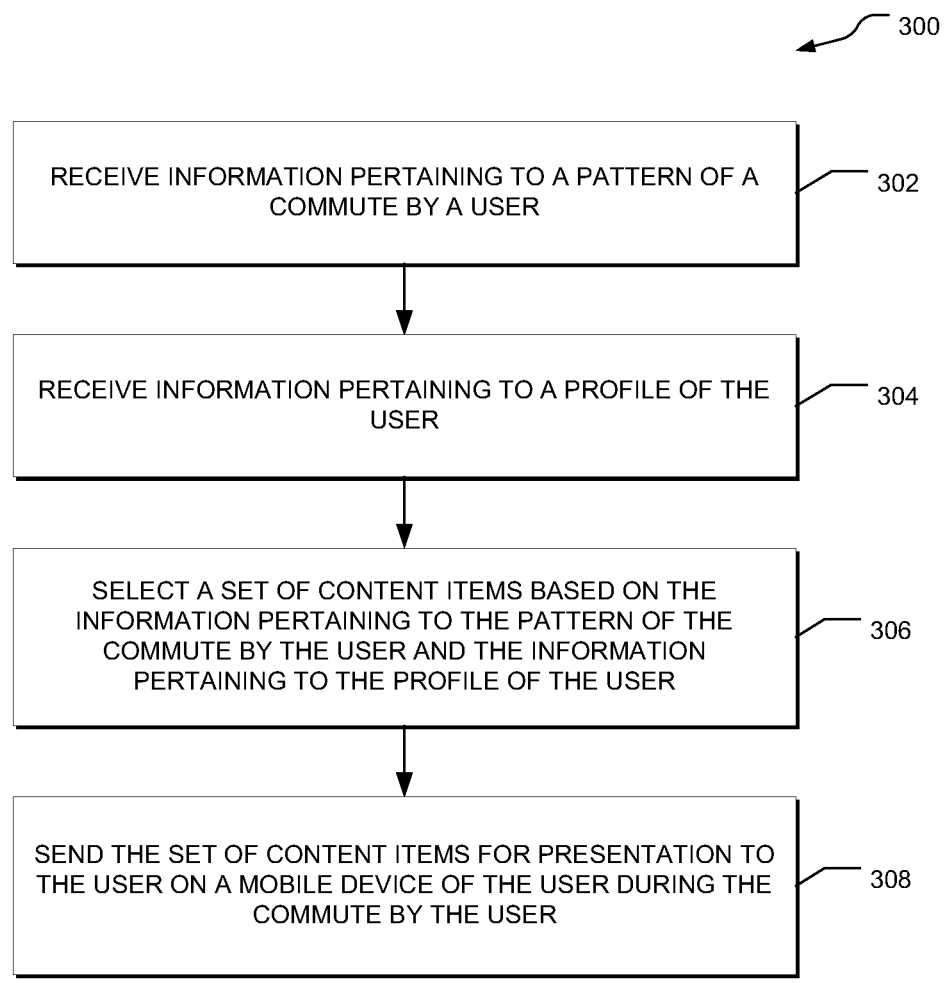
FIG. 3 is a flow chart illustrating example operations of a method of adapting content for presentation to a user during a commute of the user.

FIG. 3 is a flow chart illustrating example operations of a method 300 of adapting content for presentation to a user during a commute of the user. In various embodiments, the method 300 is implemented by the modules 202-214 of FIG. 2. At operation 302, the reception module 202 receives information pertaining to a pattern of a commute by a user. For example, the reception module 202 determines that the user travels from a first location to a second location during approximately the same time period on weekdays (e.g., commuting from home to work).

At operation 304, the reception module 202 receives information pertaining to a profile of the user (e.g., from the profile module 206). For example, the reception module 202 receives information contained in the profile of the user, such as the job title, job description, employer, connections, of the user. The reception module 202 may also receive information regarding the behavior of the user with respect to a social networking site (e.g., LinkedIn), such as information about the kinds of articles that the user has read, including the subject of the articles, time the user spent reading each of the articles, keywords associated with the content of the articles, and so on.

At operation 306, the content module 204 selects a set of content items based on the information pertaining to the pattern of the commute by the user and the information pertaining to the profile of the user. For example, based on the pattern of the commute suggesting that the user is commuting from his home to his office, the content module 204 may select content pertaining to his company, such as recent news articles about his company, posts on a social networking site about his company (e.g., by friends, coworkers, or other users outside the user's personal social network), or press releases from his company. Additionally, the content module 204 may select an amount of content based on a relevancy of the content to the user's commute and amount of time available to the user to consume the content during the commute. Thus, if the user's commute is likely to be only 20 minutes long (e.g., based on a pattern in a history of the user's commute), the content module 204 may select only a few content items having the highest relevancy, such that the user may be able to consume the content during his commute. The amount of content may be selected based on how much content the user has consumed in the past over the time period. Or based on how much content the user has consumed on previous occasions during the same portion of the commute. Additionally, the content may be selected based on the location of the user's commute, such as news pertaining to locations at or around the user's commute (e.g., news stories pertaining to local businesses or events) or news pertaining directly to a mode of transportation of the user's commute (e.g., train or bus delays, changes to train or bus schedules, traffic congestion on roads, traffic accidents, and so on).

At operation 308, the transmission module 208 may send the set of content items for presentation to the user on a mobile device of the user during the commute of the user. Thus, the content items presented to the user may enable the user to not only navigate his commute more efficiently, but also consume information that is tailored to be most relevant to the user based on the purpose of the user's commute and the time that the user has available to consume the information.

Figure 4:
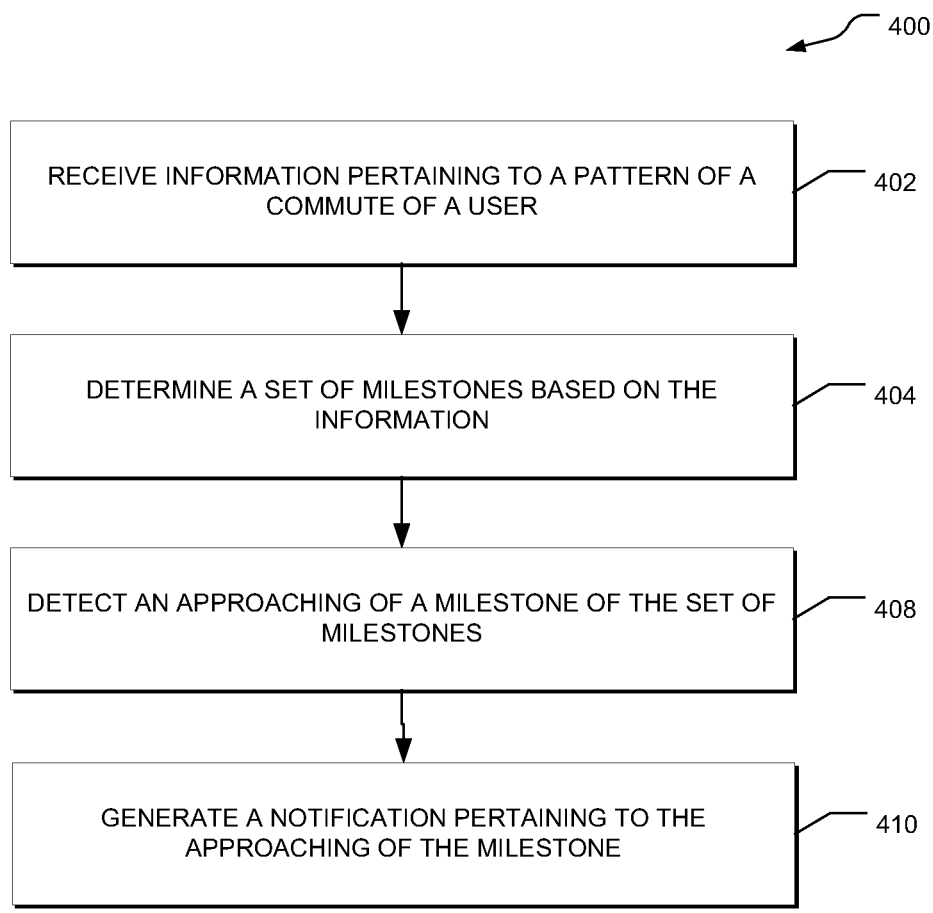
FIG. 4 is a flow chart illustrating example operations of a method of reminding a user of upcoming milestones in a commute of the user.

FIG. 4 is a flow chart illustrating example operations of a method 400 of reminding a user of upcoming milestones in a commute of the user. In various embodiments, the method 400 is implemented by the modules 202-214 of FIG. 2.

At operation 402, the reception module 202 receives information pertaining to a commute of the user. For example, the reception module 202 determines that the user typically travels from a first location to a second location at a particular time period during on a weekday.

At operation 404, the milestone module 210 determines a set of milestones based on the information pertaining to the pattern of the commute of the user. For example, the milestone module 210 determines that the user typically commences leaves his home for his office at 7:30 am on weekdays. Or the milestone module 210 determines that the user typically catches a particular bus or train at a particular time each weekday. Or the milestone module determines that the user typically chooses to make particular turns or exits during the commute.

At operation 408, the milestone module 210 detects an approaching of a milestone of the set of milestones. For example, the milestone module detects that that it is almost time for the user to board a bus or train or exist a bus or train. Or the milestone module detects that a turn or exit that the user typically makes during his commute is approaching.

At operation 410, the notification module 214 generates a notification pertaining to the approaching of the milestone. For example, the notification module generates an alarm at the user's mobile device. Or the notification module presents a notification to the user on the user's mobile device pertaining to the approaching milestone. Thus, the user may be reminded to perform an action pertaining to the commute, such as getting on or off a train or bus or making a particular turn or exit.

Figure 5:
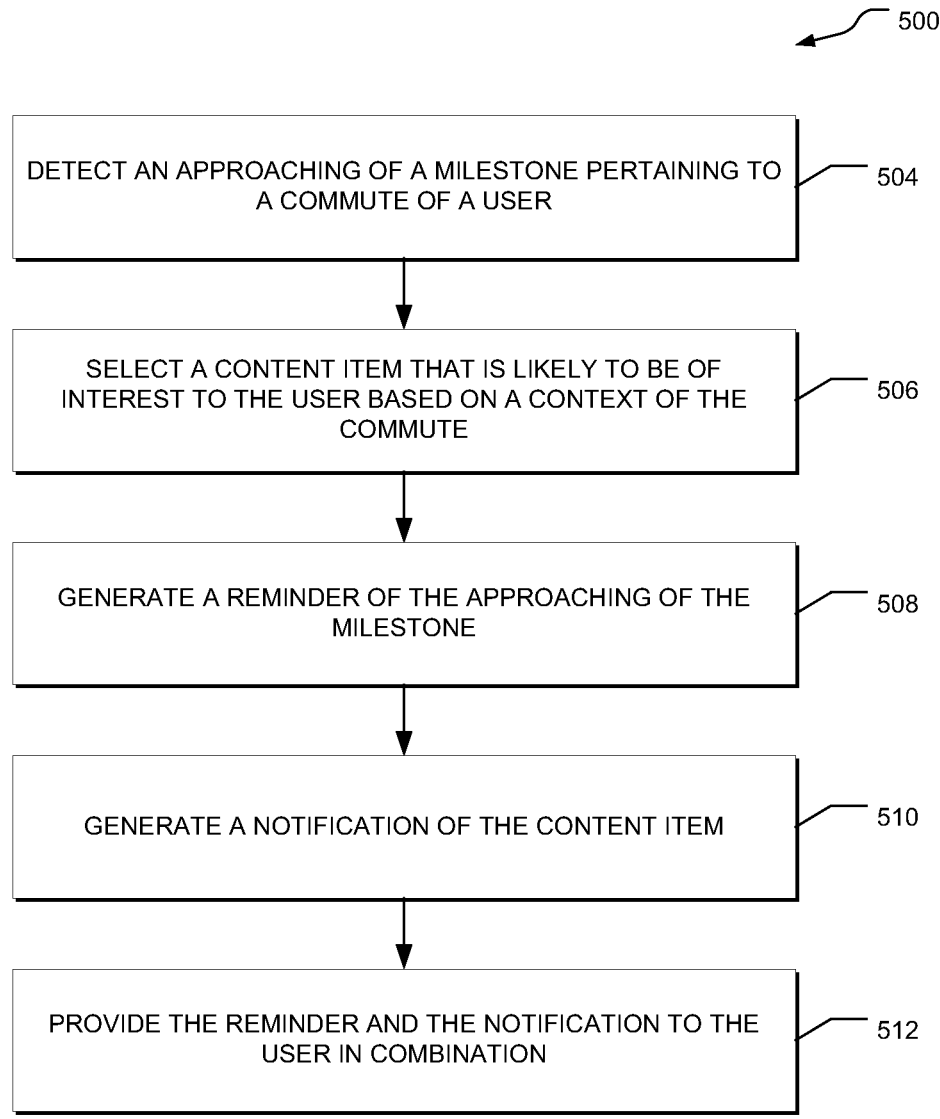
FIG. 5 is a flow chart illustrating example operations of a method of providing a user of a reminder of an approaching milestone of a commute in combination with a content item that is likely to be of interest to the user based on a context of the commute.

FIG. 5 is a flow chart illustrating example operations of a method 500 of providing a user of a reminder of an approaching milestone of a commute in combination with a content item that is likely to be of interest to the user based on a context of the commute. In various embodiments, the method 500 is implemented by the modules 202-214 of FIG. 2.

At operation 504, the milestone module 210 detects an approaching of a milestone pertaining to a commute of a user. For example, the milestone module 210 detects that a train or bus stop is approaching at which the user typically disembarks from the train or bus (e.g., based on an analysis of patterns of commuting by the user).

At operation 506, the content module 204 selects a content item that is likely to be of interest to the user based on a context of the commute. For example, based on a determination that the user is on his way into work in the morning, the content module 204 may select a content item pertaining to news at his company (e.g., a rise or fall of a stock price of the company or an article pertaining to a press release issued by his company).

At operation 508, the notification module 214 generates a reminder of the approaching of the milestone. For example, the notification module 214 generates a notification that is to be sent to a mobile device of the user to sound an alarm on the mobile device of the user to notify the user of the approaching of the milestone.

At operation 510, the notification module 214 generates a notification of the content item. For example, the notification module 214 generates a link to the content item that may be integrated into the reminder of the approaching milestone generated at operation 508.

At operation 512, the transmission module 208 transmits a combination of the generated notification of the reminder of the approaching milestone of the commute and the notification of the content item for presentation to the user. For example, the transmission module 208 sends one or more communications to a mobile device of the user including instructions for the mobile device to display the generated notifications in combination to the user. In response to receiving the one or more communications, a mobile device of the user may vibrate or otherwise alarm the user of the approaching milestone while simultaneously providing the user with access to the content item or a link to the content item (e.g., via a user interface display).

Figure 6:
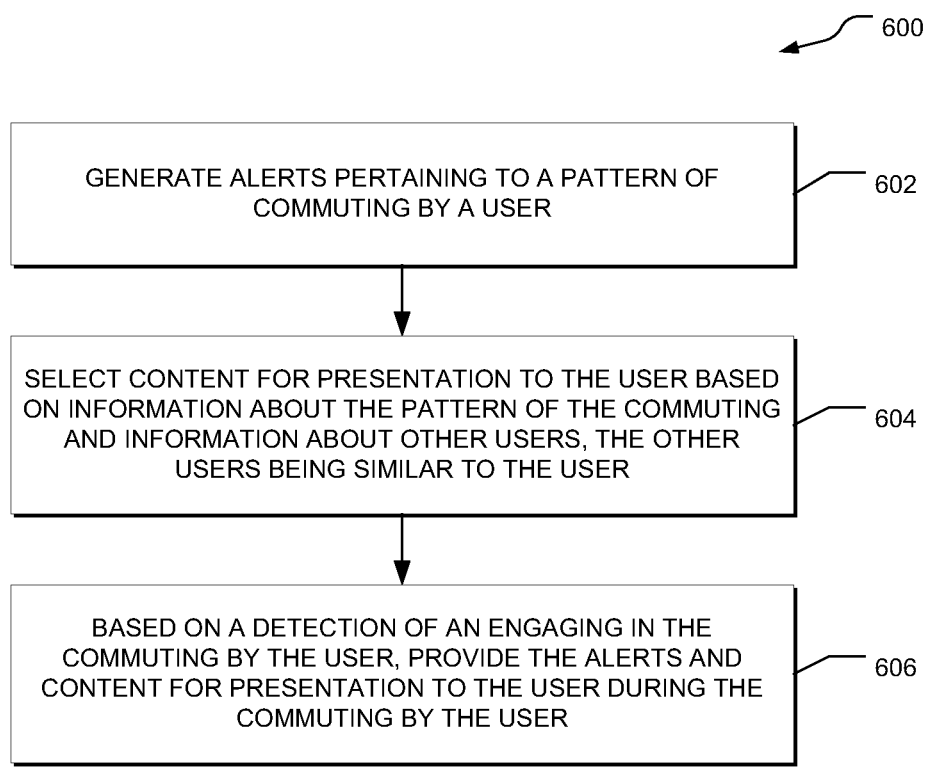
FIG. 6 is a flow chart illustrating example operations of a method 600 of providing alerts pertaining to a pattern of commuting by a user and content for presentation to the user during the commuting by the user.

FIG. 6 is a flow chart illustrating example operations of a method 600 of providing alerts pertaining to a pattern of commuting by a user and content for presentation to the user during the commuting by the user. In various embodiments, the method 600 is implemented by the modules 202-214 of FIG. 2.

At operation 602, the notification module 214 generates alerts pertaining to a pattern of a commuting by the user. For example, based on a determination that the user leaves his house during a first time range on Mondays, boards a bus at a second time range on Mondays, and exits the bus at a third time range on Mondays, the notification module 214 generates alerts corresponding to the first time range, second time range, and third time range.

At operation 604, the content module 204 selects content for presentation to the user based on information about the pattern of the commuting by the user and information about other users similar to the user. For example, the content module 204 selects an article for presentation to the user based on a determination that other users engaging in a similar pattern of commuting have been reading a particular article during their commute. Or the content module 204 selects an article for presentation to the user based on a determination that other users heading to the same final destination as the user have read the article. Or the content module 204 selects an article for presentation to the user based on a determination of the amount of time that the user will be idle (e.g., while riding on the bus) and a determination that other users idle for approximately the same amount of time during the same time of the day (e.g., morning hours) have read the article. Or the content module 204 selects an article for presentation to the user based on a determination that other users with a similar educational background or professional experience have read the article during their commutes.

In various embodiments, the content module 204 selects content for presentation to the user as a test case of content that may be presented to additional users. The content module 204 may monitor the behavior of the user with respect to the consumption of the content by the user during the user's commute and then select portions of the content for presentation to additional users based on the monitoring of the user's behavior. For example, if the content module 204 determines that the user consumes specific portions of content during the user's commute, the content module 204 may select those specific portions of the content, but not the other portions of the content, for presentation to the additional users. The additional users may be selected based on similarities between the user and the additional users (e.g., based on information gathered by the system with respect to the user and the additional users, such as information specified in the profiles of the user and the additional users, information pertaining to the behavior of the user or the additional users with respect to the social-networking system, and so on).

At operation 606, based on a detection of an engaging in the commuting by the user, the transmission module 208 transmits the alerts and the content for presentation to the user during the commuting by the user. For example, the transmission module 208 transmits the generated alerts as well as the selected content to a mobile device of the user. The mobile device may then present the alerts to the user during the commuting by the user in combination with the selected content. In this way, content particularly suited to the user's commute may be presented to the user in conjunction with alerts to keep the user on track during the commute.

In various embodiments, a method is disclosed, the method comprising detecting a pattern in a commuting by a user, selecting a content item based on a correspondence between the content item and other users and a similarity between the user and the other users, wherein the selecting is performed by one or more processors of a computer system, generating an alert pertaining to a milestone in the pattern of the commuting by the user; and transmitting the content item and the alert for presentation in combination to the user during the commuting by the user.

In various embodiments, the method is disclosed wherein the correspondence between the content item and the other users is identified based on a monitoring of the consumption of the content item by the other users during patterns of commuting by the other users.

In various embodiments, the method is disclosed wherein the similarity between the user and the other users is identified based on a comparison between an aspect of the pattern of the commute by the user and aspects of the pattern of commutes by the other users.

In various embodiments, the method is disclosed wherein the similarity between the user and the other users is identified based on comparison between an amount of idle time during a pattern of the commute by the user and amounts of idle times during the patterns of the commutes by the other users.

In various embodiments, the method is disclosed wherein the similarity between the user and the others users is based on a comparison between a profile of the user maintained with respect to a social networking system and profiles of the other users maintained with respect to the social networking system.

In various embodiments, the method is disclosed wherein the milestone in the pattern of the commute pertains to a change in a geographical direction by the user during the commute.

In various embodiments, the method is disclosed wherein the transmitting of the content item and the alert includes instructions for a simultaneous presentation of the content item and the alert in a mobile device of the user.

In various embodiments, a system is disclosed, the system comprising a memory and one or more processors coupled to the memory and configured to execute instructions contained in the memory to detect a pattern in a commuting by a user, select a content item based on a correspondence between the content item and other users and a similarity between the user and the other users, wherein the selecting is performed by one or more processors of a computer system; generate an alert pertaining to a milestone in the pattern of the commuting by the user; and transmit the content item and the alert for presentation in combination to the user during the commuting by the user.

In various embodiments, the system is disclosed wherein the correspondence between the content item and the other users is identified based on a monitoring of the consumption of the content item by the other users during patterns of commuting by the other users.

In various embodiments, the system is disclosed wherein the similarity between the user and the other users is identified based on a comparison between an aspect of the pattern of the commute by the user and aspects of the pattern of commutes by the other users.

In various embodiments, the system is disclosed wherein the similarity between the user and the other users is identified based on comparison between an amount of idle time during a pattern of the commute by the user and amounts of idle times during the patterns of the commutes by the other users.

In various embodiments, the system is disclosed wherein the similarity between the user and the others users is based on a comparison between a profile of the user maintained with respect to a social networking system and profiles of the other users maintained with respect to the social networking system.

In various embodiments, the system is disclosed wherein the milestone in the pattern of the commute pertains to a change in a geographical direction by the user during the commute.

In various embodiments, the system is disclosed wherein the transmitting of the content item and the alert includes instructions for a simultaneous presentation of the content item and the alert in a mobile device of the user.

In various embodiments, a non-transitory machine readable medium embodying a set of instructions that, when executed by a processor, cause the processor to perform operations, the operations comprising detecting a pattern in a commuting by a user, selecting a content item based on a correspondence between the content item and other users and a similarity between the user and the other users, generating an alert pertaining to a milestone in the pattern of the commuting by the user, and transmitting the content item and the alert for presentation in combination to the user during the commuting by the user.

In various embodiments, the non-transitory machine readable medium is disclosed wherein the correspondence between the content item and the other users is identified based on a monitoring of the consumption of the content item by the other users during patterns of commuting by the other users.

In various embodiments, the non-transitory machine readable medium is disclosed wherein the similarity between the user and the other users is identified based on a comparison between an aspect of the pattern of the commute by the user and aspects of the pattern of commutes by the other users.

In various embodiments, the non-transitory machine readable medium is disclosed wherein the similarity between the user and the other users is identified based on comparison between an amount of idle time during a pattern of the commute by the user and amounts of idle times during the patterns of the commutes by the other users.

In various embodiments, the non-transitory machine readable medium is disclosed wherein the similarity between the user and the others users is based on a comparison between a profile of the user maintained with respect to a social networking system and profiles of the other users maintained with respect to the social networking system.

In various embodiments, the non-transitory machine readable medium is disclosed wherein the milestone in the pattern of the commute pertains to a change in a geographical direction by the user during the commute.

Figure 7:
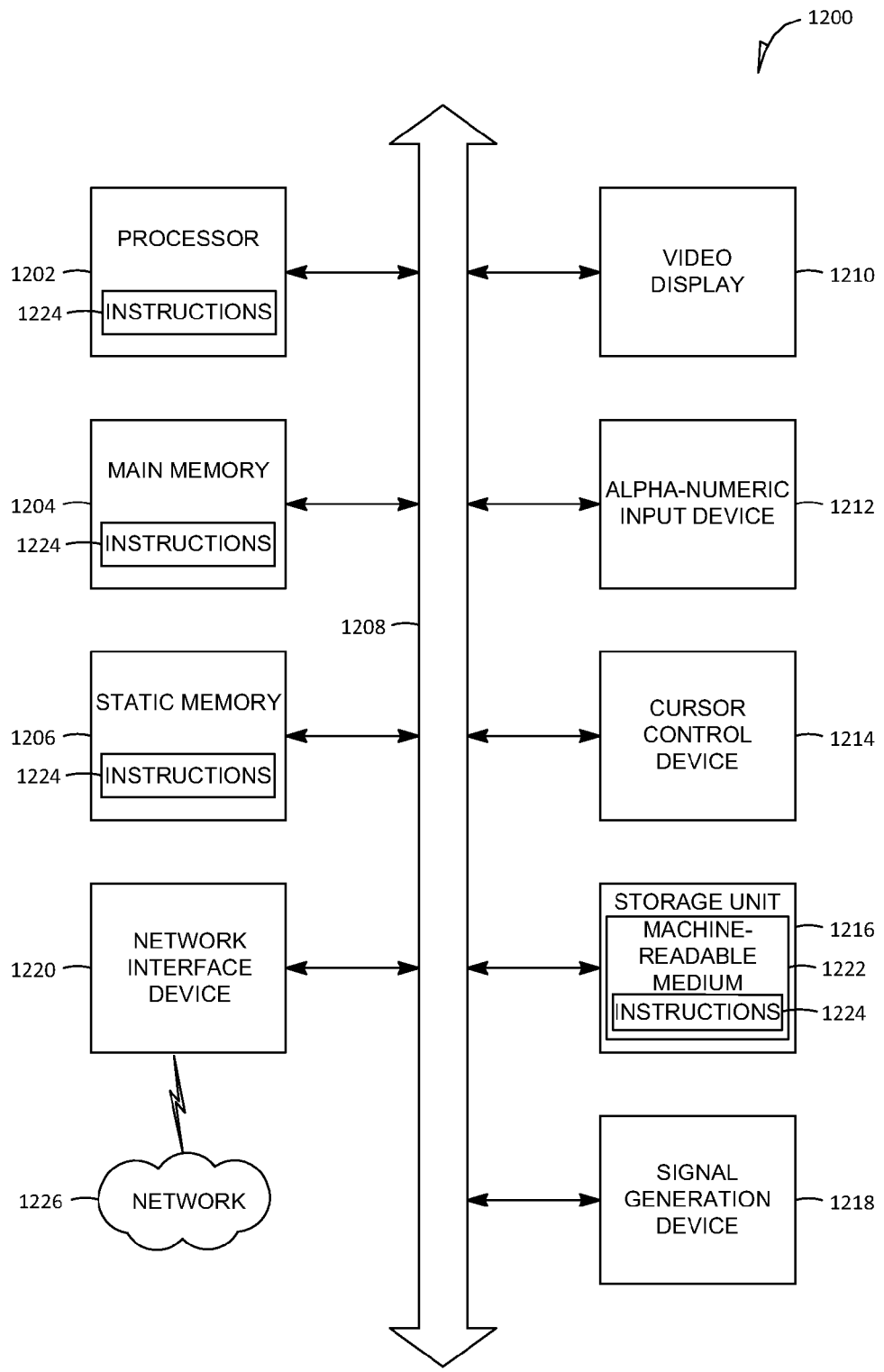
FIG. 7 is a block diagram of a machine in the example form of a computer system within which instructions for causing the machine to perform any one or more of the methodologies discussed herein may be executed.

FIG. 7 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a storage unit 1216, a signal generation device 1218 (e.g., a speaker) and a network interface device 1220.

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The network 1226 may be one of the networks 1220. The instructions 1224 may be transmitted using the network interface device 1220 and any one of a number of well-known transfer protocols (e.g., Hyper Text Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
incorporating one or more modules of a news reader system into a social network system, the one or more modules configuring one or more computer processors of the social network system to perform operations for simultaneously notifying a user of the social networking system of an upcoming milestone in a pattern of a commute of the user and of a content item that is consumable by the user during an anticipated time frame of a portion of the pattern of the commute, the operations including:
detecting the pattern in the commute of the user based on a comparison of location information received from a device of the user with a history of location information received from the device of the user;
determining a similarity between the pattern of the commute of the user and patterns of commutes of other users, the similarity pertaining to at least one of a direction of travel and a time of day;
selecting the content item from a plurality of content items based on a similarity between the user and a subset of the other users who consumed the content item during the patterns of the commutes of the other users, the similarity pertaining to at least one of educational background or professional experience;
determining that the content item is consumable by the user during the anticipated time frame of the portion of the pattern of commute based on a rate at which the user previously consumed other content items during the portion of the pattern of the commute;
generating an alert pertaining to the upcoming milestone; and
transmitting the content item and the alert for presentation in combination to the user on the device of the user.

2. The method of claim 1, wherein the similarity between the user and the subset of the other users is based on a comparison between a profile of the user maintained with respect to a social networking system and profiles of the other users maintained with respect to the social networking system.

3. The method of claim 1, wherein the milestone in the pattern of the commute pertains to a change in a geographical direction by the user during the commute.

4. A system comprising:
one or more computer processors;
one or more modules of a news reader system incorporated into a social network system, the one or more modules configuring the one or more processors to perform operations for simultaneously notifying a user of the social networking system of an upcoming milestone in a pattern of a commute of the user and of a content item that is consumable by the user during an anticipated time frame of a portion of the pattern of the commute, the operations including:
detecting the pattern in the commute of the user based on a comparison of location information received from a device of the user with a history of location information received from the device of the user;
determining a similarity between the pattern of the commute of the user and patterns of commutes of other users, the similarity pertaining to at least one of a direction of travel and a time of day;
selecting the content item from a plurality of content items based on a similarity between the user and a subset of the other users who consumed the content item during the patterns of the commutes of the other users, the similarity pertaining to at least one of educational background or professional experience;

determining that the content item is consumable by the user during the anticipated time frame of the portion of the pattern of commute based on a rate at which the user previously consumed other content items during the portion of the pattern of the commute;

generating an alert pertaining to the upcoming milestone; and transmitting the content item and the alert for presentation in combination to the user on the device of the user.

5. The system of claim 4, wherein the similarity between the user and the subset of the other users is based on a comparison between a profile of the user maintained with respect to a social networking system and profiles of the other users maintained with respect to the social networking system.

6. The system of claim 4, wherein the milestone in the pattern of the commute pertains to a change in a geographical direction by the user during the commute.

7. A non-transitory machine readable medium embodying a set of instructions that, when executed one or more processors, cause the one or more processors to perform operations, the operations comprising:

simultaneously notifying a user of a social networking system of an upcoming milestone in a pattern of a commute of the user and of a content, item that is consumable by the user during an anticipated time frame of a portion of the pattern of the commute, the simultaneous notifying including:

detecting the pattern in the commute of the user based on a comparison of location information received from a device of the user with a history location information received from the device of the user;

determining a similarity between the pattern of the commute of the user and patterns of commutes of other users, the similarity pertaining to at least one of a direction of travel and a time of day;

selecting the content item from a plurality of content items based on a similarity between the user and a subset of the other users who consumed the content item during the patterns of the commutes of the other users, the similarity pertaining to at least one of educational background or professional experience;

determining that the content item is consumable by the user during the anticipated time frame of the portion of the pattern of commute based on a rate at which the user previously consumed other content items during the portion of the pattern of the commute;

generating an alert pertaining to the upcoming milestone; and transmitting the content item and the alert for presentation in combination to the user on the device of the user.

8. The non-transitory machine readable medium of claim 7, wherein the similarity between the user and the subset of the other users is based on a comparison between a profile of the user maintained with respect to a social networking system and profiles of the other users maintained with respect to the social networking system.

9. The non-transitory machine readable medium of claim 7, wherein the milestone in the pattern of the commute pertains to a change in a geographical direction by the user during the commute.

* * * * *

UNITED STATES PATENT AND TRADEMARK OFFICE
CERTIFICATE OF CORRECTION

PATENT NO. : 9,680,907 B2
APPLICATION NO. : 13/833474
DATED : June 13, 2017
INVENTOR(S) : Redfern et al.

Page 1 of 1

It is certified that error appears in the above-identified patent and that said Letters Patent is hereby corrected as shown below:

On the Title Page

Item (73), in "Assignee", in Column 1, Line 1, delete "LindkedIn Corporation," and insert --LinkedIn Corporation,-- therefor In the Claims In Column 13, Line 22, in Claim 7, after "executed", insert --by--

In Column 13, Line 27, in Claim 7, delete "content," and insert --content-- therefor In Column 14, Line 1, in Claim 7, after "history", insert --of--

Signed and Sealed this
Tenth Day of April, 2018

Andrei Iancu
*Director of the United States Patent and Trademark Office*